United States Patent [19]

Yokoyama et al.

[11] Patent Number: 5,777,032

[45] Date of Patent: Jul. 7, 1998

[54] OCULAR LENS AND A METHOD FOR ITS PRODUCTION

[75] Inventors: Yasuhiro Yokoyama; Yuriko Watanabe; Sadayasu Tanikawa, all of Kasugai; Shoji Ichinohe; Toshio Yamazaki, both of Gunma-ken, all of Japan

[73] Assignee: Menicon Co., Ltd., Nagoya, Japan

[21] Appl. No.: 805,575

[22] Filed: Feb. 25, 1997

[30] Foreign Application Priority Data

Mar. 4, 1996 [JP] Japan ................................ 8-046403

[51] Int. Cl.$^6$ .................................................. C08F 8/30

[52] U.S. Cl. ..................... 505/123; 525/328.8; 525/342; 526/379

[58] Field of Search ................. 525/123, 328.8, 525/342; 526/279

[56] References Cited

U.S. PATENT DOCUMENTS 5,177,165  1/1993  Valint et al. ............................ 526/245
5,260,000  11/1993  Nandu et al. ........................... 264/2.1
5,374,662  12/1994  Lai et al. ................................ 522/172

FOREIGN PATENT DOCUMENTS 396364     11/1990  European Pat. Off. .
94-25406   11/1994  European Pat. Off. .
95-344124  12/1995  Japan .
91-08241   6/1991   WIPO .
94-21698   9/1994   WIPO .

*Primary Examiner*—Bernard Lipman
*Attorney, Agent, or Firm*—Oblon, Spivak, McClelland, Maier & Neustadt, P.C.

[57] ABSTRACT

An ocular lens obtained by reacting a hydroxyl group-containing polymer shaped to have an ocular lens shape, with a silicon-containing compound of the formula (I):

$$O=C=N-R^1-Si_nO_{n-1}(CH_3)_{2n+1} \qquad (I)$$

wherein $R^1$ is a $C_{1-6}$ linear or branched alkylene group, and n is an integer of from 1 to 15.

8 Claims, No Drawings

OCULAR LENS AND A METHOD FOR ITS PRODUCTION

The present invention relates to an ocular lens and a method for its production. More particularly, it relates to an ocular lens which is excellent not only in transparency, oxygen permeability and wettability with water but also in sliding property, low friction property, anti-thrombogenic property, dimensional stability, durability, etc. and which is useful as a contact lens or an intraocular lens, and a method for producing such an ocular lens.

Heretofore, as a method for obtaining a soft lens, a method of softening a lens material made of a hard polymer by esterification treatment and/or ester exchange treatment, has been known (JP-B-53-31189 and JP-B-59-33887). The method is specifically a method wherein a lens material made of a hard polymer obtained by bulk polymerization using e.g. acrylic acid, methacrylic acid or an acrylate as a polymerizable component, is cut, ground and polished into a lens shape and then immersed in e.g. a $C_{3-10}$ alcohol for esterification treatment and/or ester exchange treatment to lower the glass transition temperature of the hard polymer thereby to obtain a soft lens. By such a method, it is certainly possible to obtain a soft lens, but such a soft lens is not suitable as an ocular lens, since its oxygen permeability is not good. Further, by such a method, it is difficult to obtain a soft ocular lens giving a comfortable feeling to the wearer, since the soft lens thereby obtainable is poor in wettability with water.

The present invention has been made in view of the above-described prior art, and it is an object of the present invention to provide an ocular lens which is excellent not only in transparency but also in oxygen permeability and wettability, and a method for its production.

The present invention provides an ocular lens obtained by reacting a hydroxyl group-containing polymer shaped to have an ocular lens shape, with a silicon-containing compound of the formula (I):

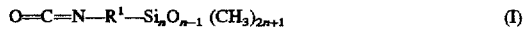

wherein $R^1$ is a $C_{1-6}$ linear or branched alkylene group, and n is an integer of from 1 to 15.

The present invention also provides a method for producing an ocular lens, which comprises reacting a hydroxyl group-containing polymer shaped to have an ocular lens shape, with a silicon-containing compound of the formula (I):

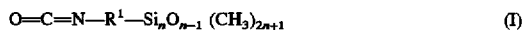

wherein $R^1$ is a $C_{1-6}$ linear or branched alkylene group, and n is an integer of from 1 to 15.

Now, the present invention will be described in detail with reference to the preferred embodiments.

As mentioned above, the ocular lens of the present invention is one obtained by reacting a hydroxyl group-containing polymer shaped to have an ocular lens shape, with a silicon-containing compound of the formula (I):

wherein $R^1$ is a $C_{1-6}$ linear or branched alkylene group, and n is an integer of from 1 to 15.

The ocular lens of the present invention is excellent not only in transparency but also in wettability and oxygen permeability. Such excellent physical properties of the ocular lens are believed to be obtainable as follows.

When the hydroxyl group-containing polymer shaped to have an ocular lens shape is represented by the formula A—OH, the hydroxyl group in such a hydroxyl group-containing polymer is reacted with an isocyanate group in the silicon-containing compound of the above formula (I) as represented by the formula:

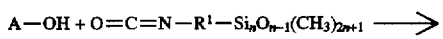

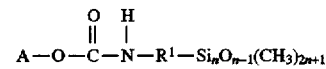

to form an urethane bond in the product, whereby excellent wettability (hydrophilic property) is imparted to the resulting ocular lens, and due to excellent oxygen permeability of the silicon-containing compound itself, the resulting ocular lens will simultaneously have excellent oxygen permeability.

With respect to the hydroxyl group-containing polymer shaped to have an ocular lens shape, to be used in the present invention, there is no particular restriction as to its constituting components, so long as it has desired optical properties such as excellent transparency as an ocular lens material and it has a hydroxyl group capable of reacting with an isocyanate group in the silicon-containing compound which will be described hereinafter.

As such a hydroxyl group-containing polymer shaped to have an ocular lens shape, it is possible to use, for example, one obtained by shaping a polymer obtained by polymerizing polymerizable components containing a hydroxyl group-containing monomer, into a desired ocular lens shape.

Such a hydroxyl group-containing monomer may, for example, be a hydroxyl group-containing styrene monomer such as p-hydroxystyrene, a hydroxyl group-containing (meth)acrylate such as 2-hydroxyethyl (meth)acrylate, 2-hydroxypropyl (meth)acrylate, 2-hydroxybutyl (meth)acrylate, 2,3-dihydroxylpropyl (meth)acrylate, 2-hydroxyl-3-phenoxypropyl (meth)acrylate or hydroxyoctyl (meth)acrylate, or a monomer having a sugar residue and a copolymerizable unsaturated double bond, such as 1-O-(meth)acryl-2,3;5,6-di-O-isopropylidene-D-mannoflactose, 3-O-(meth)acryl-1,2;5,6-di-O-isopropylidene-D-glucoflactose or 6-O-(meth)acryl-1,2;3,4-di-O-isopropylidene-D-galactose. These monomers may be used alone or in combination as a mixture of two or more of them.

The amount of the hydroxyl group-containing monomer is usually at least 5 wt %, preferably at least 8 wt %, more preferably at least 10 wt % of the total amount of the polymerizable components, so that the hydroxyl groups in the hydroxyl group-containing polymer are sufficiently reacted with the isocyanate group in the after-mentioned silicon-containing compound so as to sufficiently to improve the oxygen permeability and wettability of the ocular lens.

In the present invention, the hydroxyl group-containing polymer may be a polymer obtained by polymerizing a polymer component composed solely of a hydroxyl group-containing monomer i.e. a polymerizable component wherein the amount of the hydroxyl group-containing monomer is 100 wt %. However, it may be a polymer obtained by polymerizing polymerizable components comprising the hydroxyl group-containing monomer and a monomer having a copolymerizable unsaturated double bond (hereinafter referred to as a polymerizable monomer). The type of the polymerizable monomer is not particularly limited, so long as it does not impair the purpose of the present invention.

The polymerizable monomer may be selected suitably depending upon the nature of the desired ocular lens, and its amount may be suitably adjusted so that the total amount of polymerizable components will be 100 wt %. For example, to obtain an ocular lens having a relatively low water absorptivity, a hydrophobic monomer or macromonomer may be selected for use, and to obtain an ocular lens having a high water absorptivity, a hydrophilic monomer or macromonomer may be selected for use. Further, to obtain an ocular lens excellent in mechanical strength, a reinforcing monomer or macromonomer may be selected for use, and to obtain an ocular lens excellent in water resistance or solvent resistance, a crosslinkable monomer for forming a crosslinked structure may be selected for use.

Specifically, for example, in a case where it is desired to further impart oxygen permeability to the resulting ocular lens and at the same time to reinforce the mechanical strength of the ocular lens, a polysiloxane macromonomer, such as a polysiloxane macromonomer having a polymerizable group bonded to the siloxane main chain via one or two urethane bonds, a polysiloxane macromonomer having a polymerizable group bonded directly to the siloxane main chain or a polysiloxane macromonomer having a polymerizable group bonded to the siloxane main chain via an alkylene group, may be used.

Such a polysiloxane macromonomer may, for example, be a macromonomer of the formula (II):

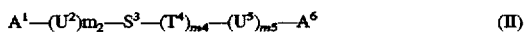
(II)

wherein $A^1$ is a group of the formula:

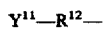

wherein $Y^{11}$ is an acryloyloxy group, a methacryloyloxy group, a vinyl group or an allyl group, and $R^{12}$ is a $C_{1-6}$ linear or branched alkylene group;

$A^6$ is a group of the formula:

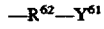

wherein $R^{62}$ is a $C_{1-6}$ linear or branched alkylene group, and $Y^{61}$ is an acryloyloxy group, a methacryloyloxy group, a vinyl group or an allyl group;

$U^2$ is a group of the formula:

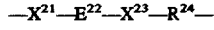

wherein $X^{21}$ is a covalent bond, an oxygen atom or a $C_{1-6}$ alkylene glycol group, $E^{22}$ is a —NHCO— group or a bivalent group wherein the terminals derived from a diisocyanate selected from a saturated aliphatic type, an alicyclic type and an aromatic type, are a —CONH— group and a —NHCO— group, $X^{23}$ is an oxygen atom, a $C_{1-6}$ alkylene glycol group or a group of the formula:

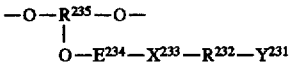

wherein $R^{235}$ is a $C_{1-6}$ trivalent hydrocarbon group, $R^{232}$ is a $C_{1-6}$ linear or branched alkylene group, $E^{234}$ is a —CONH— group or a bivalent group wherein the terminals derived from a diisocyanate selected from a saturated aliphatic type, an alicyclic type and an aromatic type, are a —CONH— group and a —NHCO— group, $X^{233}$ is a covalent bond, an oxygen atom or a $C_{1-6}$ alkylene glycol group, and $Y^{231}$ is an acryloyloxy group, a methacryloyloxy group, a vinyl group or an allyl group, provided that $X^{233}$ is a covalent bond when the adjacent $E^{234}$ is a —CONH— group, or an oxygen atom or a $C_{1-6}$ alkylene glycol group when the adjacent $E^{234}$ is a bivalent group derived from the isocyanate, and $E^{234}$ forms a urethane bond between the adjacent oxygen atom and $X^{233}$, and $R^{24}$ is a $C_{1-6}$ linear or branched alkylene group, provided that $X^{21}$ is a covalent bond when the adjacent $E^{22}$ is a —CONH— group, or $X^{21}$ is an oxygen atom or a $C_{1-6}$ alkylene glycol group when the adjacent $E^{22}$ is the bivalent group derived from the diisocyanate, and $E^{22}$ forms a urethane bond between the adjacent $E^{21}$ and $X^{23}$; $U^5$ is a group of the formula:

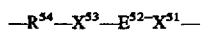

wherein $R^{54}$ is a $C_{1-6}$ linear or branched alkylene group, $X^{53}$ is an oxygen atom, a $C_{1-6}$ alkylene glycol group or a group of the formula:

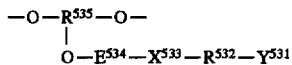

wherein $R^{535}$ is a $C_{1-6}$ trivalent hydrocarbon group, $R^{532}$ is a $C_{1-6}$ linear or branched alkylene group, $E^{534}$ is a —CONH— group or a bivalent group wherein the terminals derived from a diisocyanate selected from a saturated aliphatic type, an alicyclic type and an aromatic type, are a —CONH— group and a —NHCO— group, $X^{533}$ is a covalent bond, an oxygen atom or a $C_{1-6}$ alkylene glycol group, $Y^{531}$ is an acryloyloxy group, a methacryloyloxy group, a vinyl group or an allyl group, provided that $X^{533}$ is a covalent bond when the adjacent $E^{534}$ is a —CONH— group, or an oxygen atom or a $C_{1-6}$ alkylene glycol group when the adjacent $E^{534}$ is a bivalent group derived from the diisocyanate, and $E^{534}$ forms an urethane bond between the adjacent oxygen atom and $X^{533}$, $E^{52}$ is a —CONH— group or a bivalent group wherein the terminals derived from a diisocyanate selected from an unsaturated aliphatic type, an alicyclic type and an aromatic type, are a —CONH— group and a —NHCO— group, and $X^{51}$ is a covalent bond, an oxygen atom or a $C_{1-6}$ alkylene glycol group, provided that $X^{51}$ is a covalent bond when the adjacent $E^{52}$ is a —CONH— group, or an oxygen atom or a $C_{1-6}$ alkylene glycol group when the adjacent $E^{52}$ is a bivalent group derived from the diisocyanate, and $E^{52}$ forms a urethane bonds between the adjacent $X^{51}$ and $E^{53}$;

$S^3$ is a group of the formula:

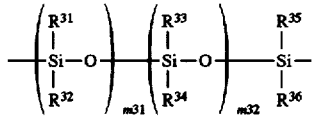

wherein each of $R^{31}$, $R^{32}$, $R^{33}$, $R^{35}$ and $R^{36}$ which are independent of one another, is a $C_{1-6}$ linear or branched alkyl group, of which some or all of hydrogen atoms may be substituted by fluorine atoms, or a phenyl group, $R^{34}$ is a $C_{1-6}$ linear or branched alkyl group, of which some or all of hydrogen atoms may be substituted by fluorine atoms, a phenyl group or a group of the formula:

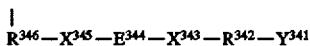

wherein each of $R^{346}$ and $R^{342}$ which are independent of each other, is a $C_{1-6}$ linear or branched alkylene group, each of $X^{345}$ and $X^{343}$ is a covalent bond, an oxygen atom or a $C_{1-6}$ alkylene glycol group, $E^{344}$ is a —CONH— group or a bivalent group wherein the terminals derived from a diisocyanate selected from a saturated aliphatic type, an alicyclic type and an aromatic type, are a —CONH— group and a —NHCO— group, and $Y^{341}$ is an acryloyloxy group, a methacryloyloxy group, a vinyl group or an allyl group, provided that each of $X^{345}$ and $X^{343}$ is a covalent bond when the adjacent $E^{344}$ is a —CONH— group, or an oxygen atom or a $C_{1-6}$ alkylene glycol group when the adjacent $E^{344}$ is a bivalent group derived from the diisocyanate, and $E^{344}$ forms an urethane bond between the adjacent $X^{345}$ and $X^{343}$ provided that a case where all of $R^{31}$, $R^{32}$, $R^{33}$, $R^{34}$, $R^{35}$ and $R^{36}$ are simultaneously $C_{1-6}$ linear or branched alkyl groups wherein some or all of hydrogen atoms are substituted by fluorine atoms, or phenyl groups, is excluded, m31 is an integer of from 1 to 100, m32 is an integer of from 0 to (100−(m31)), provided that (m31)+(m32) is an integer of from 1 to 100; and $T^4$ is a group of the formula:

$$-U^{41}-S^{42}-$$

wherein $U^{41}$ is a group of the formula:

$$-R^{411}-X^{412}-E^{413}-X^{414}-R^{415}-$$

wherein each of $R^{411}$ and $R^{415}$ which are independent of each other, is a $C_{1-6}$ linear or branched alkylene group, each of $X^{412}$ and $X^{414}$ which are independent of each other, is an oxygen atom or a $C_{1-6}$ alkylene glycol group, and $E^{413}$ is a bivalent group wherein the terminals derived from a diisocyanate selected from a saturated aliphatic type, an alicyclic type and an aromatic type, are a —CONH— group and a —NHCO— group, provided that $E^{413}$ forms an urethane bond between the adjacent $X^{412}$ and $X^{414}$, and $S^{42}$ is a group of the formula:

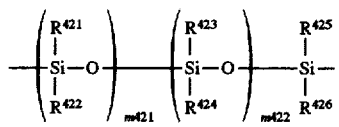

wherein each of $R^{421}$, $R^{422}$, $R^{423}$, $R^{425}$ and $R^{426}$ which are independent of one another, is a $C_{1-6}$ linear or branched alkyl group wherein some or all of hydrogen atoms may be substituted by fluorine atoms, or a phenyl group, $R^{424}$ is a $C_{1-6}$ linear or branched alkyl group wherein some or all of hydrogen atoms may be substituted by fluorine atoms, a phenyl group or a group of the formula:

$$R^{4246}-X^{4245}-E^{4244}-X^{4243}-R^{4242}-Y^{4241}$$

wherein each of $R^{4246}$ and $R^{4242}$ which are independent of each other, is a $C_{1-6}$ linear or branched alkylene group, each of $X^{4245}$ and $X^{4243}$ is a covalent bond, an oxygen atom or a $C_{1-6}$ alkylene glycol group, $E^{4244}$ is a —CONH— group or a bivalent group wherein the terminals derived from a diisocyanate selected from a saturated aliphatic type, an alicyclic type and an aromatic type, are a —CONH— group and a —NHCO— group, and $Y^{4241}$ is an acryloyloxy group, a methacryloyloxy group, a vinyl group or an allyl group, provided that each of $X^{4245}$ and $X^{4243}$ is a covalent bond when the adjacent $E^{4244}$ is a —CONH— group, or an oxygen atom or a $C_{1-6}$ alkylene glycol group when the adjacent $E^{4244}$ is a bivalent group derived from the diisocyanate, and $E^{4244}$ forms an urethane bond between the adjacent $X^{4245}$ and $X^{4243}$, provided that a case wherein all of $R^{421}$, $R^{422}$, $R^{423}$, $R^{424}$, $R^{425}$ and $R^{426}$ are simultaneously $C_{1-6}$ linear or branched alkyl groups wherein some or all of hydrogen atoms are substituted by fluorine atoms, or phenyl groups, is excluded, m421 is an integer of from 1 to 100, and m422 is an integer of from 0 to (100−(m421)), provided that (m421)+(m422) is an integer of from 1 to 100, or a group of the formula:

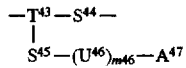

wherein $T^{43}$ is a group of the formula:

$$-R^{431}-X^{432}-T^{433}-X^{434}-R^{435}- \atop X^{436}-R^{437}-$$

wherein each of $R^{431}$, $R^{435}$ and $R^{437}$ which are independent of one another, is a $C_{1-6}$ linear or branched alkylene group, each of $X^{432}$, $X^{434}$ and $X^{436}$ which are independent of one another, is an oxygen atom or a $C_{1-6}$ alkylene glycol group, and $T^{433}$ is a group of the formula:

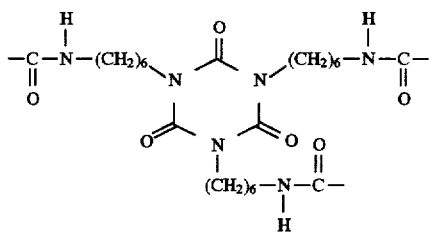

provided that it forms a urethane bond among the adjacent $X^{432}$, $X^{434}$ and $X^{436}$, $S^{44}$ is a group of the formula:

wherein each of $R^{441}$, $R^{442}$, $R^{443}$, $R^{445}$ and $R^{446}$ which are independent of one another is a $C_{1-6}$ linear or branched alkyl group wherein some or all of hydrogen atoms may be substituted by fluorine atoms, or a phenyl group, $R^{444}$ is a $C_{1-6}$ linear or branched alkyl group wherein some or all of hydrogen atoms may be substituted by fluorine atoms, a phenyl group or a group of the formula:

$$R^{4446}-X^{4445}-E^{4444}-X^{4443}-R^{4442}-Y^{4441}$$

wherein each of $R^{4446}$ and $R^{4442}$ which are independent of each other, is a $C_{1-6}$ linear or branched alkylene group, each of $X^{4445}$ and $X^{4443}$ is a covalent bond, an oxygen atom or a $C_{1-6}$ alkylene glycol group, $E^{4444}$ is a —CONH— group or a bivalent group wherein the terminals derived from a diisocyanate selected from a saturated aliphatic type, an alicyclic type and an aromatic type, are a —CONH— group and a —NHCO— group, and $Y^{4441}$ is an acryloyloxy group, a methacryloyloxy group, a vinyl group or an allyl group, provided that each of $X^{4445}$ and $X^{4443}$ is a covalent bond when the adjacent $E^{4444}$ is a —CONH— group, or an oxygen atom or a $C_{1-6}$ alkylene glycol group when the adjacent $E^{4444}$ is a bivalent group derived from the isocyanate, and $E^{4444}$ forms a urethane bond between the adjacent $X^{4445}$ and $X^{4443}$, provided that a case wherein all of $R^{441}$, $R^{442}$, $R^{443}$, $R^{444}$, $R^{445}$ and $R^{446}$ are simultaneously $C_{1-6}$ linear or branched alkyl groups wherein some or all of hydrogen atoms are substituted by fluorine atoms, or phenyl groups, is excluded, m441 is an integer of from 1 to 100, and m442 is an integer of from 0 to (100−(m441), provided that (m441)+(m442) is an integer of from 1 to 100, $S^{45}$ is a group of the formula:

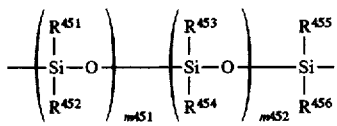

wherein each of $R^{451}$, $R^{452}$, $R^{453}$, $R^{455}$ and $R^{456}$ which are independent of one another, is a $C_{1-6}$ linear or branched alkyl group wherein some or all of hydrogen atoms may be substituted by fluorine atoms, or a phenyl group, $R^{454}$ is a $C_{1-6}$ linear or branched alkyl group wherein some or all of hydrogen atoms may be substituted by fluorine atoms, a phenyl group or a group of the formula:

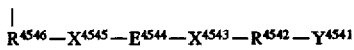

wherein each of $R^{4546}$ and $R^{4542}$ which are independent of each other, is a $C_{1-6}$ linear or branched alkylene group, each of $X^{4545}$ and $X^{4543}$ is a covalent bond, an oxygen atom or a $C_{1-6}$ alkylene glycol group, $E^{4544}$ is a —CONH— group or a bivalent group wherein the terminals derived from a diisocyanate selected from a saturated aliphatic type, an alicyclic type and an aromatic type, are a —CONH— group and a —NHCO— group, $Y^{4541}$ is an acryloyloxy group, a methacryloyloxy group, a vinyl group or an allyl group, provided that each of $X^{4545}$ and $X^{4543}$ is a covalent bond when the adjacent $E^{4544}$ is a —CONH— group, or an oxygen atom or a $C_{1-6}$ alkylene glycol group when the adjacent $E^{4544}$ is a bivalent group derived from the diisocyanate, and $E^{4544}$ forms a urethane bond between the adjacent $X^{4545}$ and $X^{4543}$, provided that a case wherein all of $R^{451}$, $R^{452}$, $R^{453}$, $R^{454}$, $R^{455}$ and $R^{456}$ are simultaneously $C_{1-6}$ linear or branched alkyl groups wherein some or all of hydrogen atoms are substituted by fluorine atoms, or phenyl groups, is excluded, m451 is an integer of from 1 to 100, and m452 is an integer of from 0 to (100−(m451), provided that (m451)+(m452) is an integer of from 1 to 100, $U^{46}$ is a group of the formula:

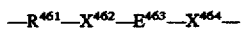

wherein $R^{461}$ is a $C_{1-6}$ linear or branched alkylene group, $X^{462}$ is an oxygen atom, a $C_{1-6}$ alkylene glycol group or a group of the formula:

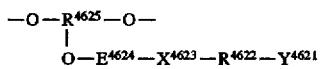

wherein $R^{4625}$ is a $C_{1-6}$ trivalent hydrocarbon group, $R^{4622}$ is a $C_{1-6}$ linear or branched alkylene group, $E^{4624}$ is a —CONH— group or a bivalent group wherein the terminals derived from a diisocyanate selected from a saturated aliphatic type, an alicyclic type and an aromatic type, are a —CONH— group and a —NHCO— group, $X^{4623}$ is a covalent bond, an oxygen atom or a $C_{1-6}$ alkylene glycol group, and $Y^{4621}$ is an acryloyloxy group, a methacryloyloxy group, a vinyl group or an allyl group, provided that $X^{4623}$ is a covalent bond when the adjacent $E^{4624}$ is a —CONH— group, or an oxygen atom or a $C_{1-6}$ alkylene glycol group when the adjacent $E^{4624}$ is a bivalent group derived from the isocyanate, and $E^{4624}$ forms a urethane bond between the adjacent oxygen atom and $X^{4623}$, $E^{463}$ is a —CONH— group or a bivalent group wherein the terminals derived from a diisocyanate selected from a saturated aliphatic type, an alicyclic type and an aromatic type, are a —CONH— group and a —NHCO— group, $X^{464}$ is a covalent bond, an oxygen atom or a $C_{1-6}$ alkylene glycol group, provided that $X^{464}$ is a covalent bond when the adjacent $E^{463}$ is a —CONH— group, or an oxygen atom or a $C_{1-6}$ alkylene glycol group when the adjacent $E^{463}$ is a bivalent group derived from the diisocyanate, and $E^{463}$ forms a urethane bond between the adjacent $X^{462}$ and $X^{464}$, and $A^{47}$ is a group of the formula:

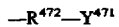

wherein $R^{472}$ is a $C_{1-6}$ linear or branched alkylene group, and $R^{471}$ is an acryloyloxy group, a methacryloyloxy group, a vinyl group or an allyl group, and m46 is 0 or 1, m2 is 0 or 1, m4 is 0, 1, 2 or 3, and m5 is 0 or 1, provided that m2, m5 and m46 are all the same; such as an urethane bond-containing polysiloxane macromonomer (hereinafter referred to as macromonomer a) of the formula:

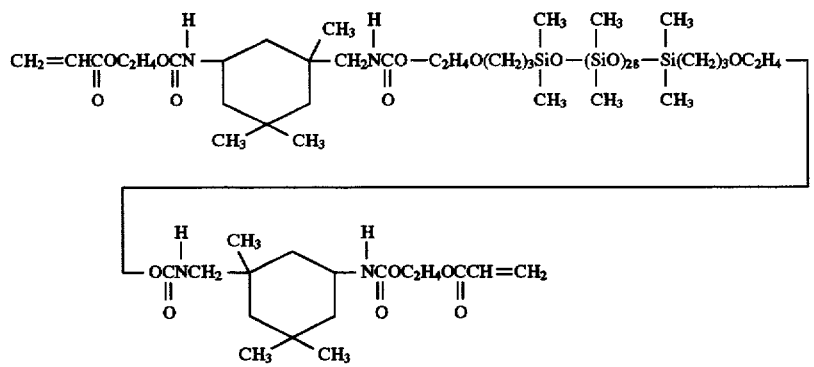

Such polysiloxane macromonomers may be used alone or in combination as a mixture of two or more of them. The amount of such a polysiloxane macromonomer may be suitably adjusted depending upon the nature of the desired ocular lens. For example, in a case where it is desired to obtain a low water-absorptive highly oxygen permeable ocular lens material, in order to obtain adequate effects for improving oxygen permeability and for reinforcing the mechanical strength, it is advisable to adjust the amount of the polysiloxane macromonomer to a level of at least 2 wt %, preferably at least 5 wt %, more preferably at least 10 wt % of the total amount of the polymerizable components. Further, in order to avoid deterioration of the compatibility with other polymerizable components, it is advisable to adjust the amount to a level of at most 30 wt %, preferably at most 20 wt %, more preferably at most 15 wt %, of the total amount of the polymerizable components.

For example, when it is desired to further improve the oxygen permeability of the resulting ocular lens, a silicon-containing monomer, such as a silicon-containing alkyl (meth)acrylate, a silicon-containing styrene derivative or an alkylvinyl silane, may be employed.

The silicon-containing alkyl (meth)acrylate may, for example, be an organopolysiloxane-containing alkyl (meth) acrylate, such as pentamethyldisiloxanylmethyl (meth) acrylate, trimethylsiloxydimethylsilylpropyl (meth)acrylate, methylbis(trimethylsiloxy)silylpropyl (meth)acrylate, tris (trimethylsiloxy)silylpropyl (meth)acrylate, mono [methylbis(trimethylsiloxy)siloxy]bis(trimethyl siloxy) silylpropyl (meth)acrylate, tris[methylbis(trimethylsiloxy) siloxy]silylpropyl (meth)acrylate, methyl[bis (trimethylsiloxy)]silylpropylglyceryl (meth)acrylate, tris (trimethylsiloxy)silylpropylglyceryl (meth)acrylate, mono [methylbis(trimethylsiloxy)siloxy]bis(trimethyl siloxy) silylpropylglyceryl (meth)acrylate, trimethylsilylethyltetramethyldisiloxanylpropylglyceryl (meth)acrylate, trimethylsilylmethyl (meth)acrylate, trimethylsilylpropyl (meth)acrylate, trimethylsilylpropylglyceryl (meth)acrylate, pentamethyldisiloxanylpropylglyceryl (meth)acrylate, methylbis(trimethylsiloxy) silylethyltetramethyl disiloxanylmethyl (meth)acrylate, tetramethyltriisopropylcyclotetrasiloxanylpropyl (meth) acrylate, tetramethyltriisopropylcyclotetrasiloxybis (trimethyl siloxy)silylpropyl (meth)acrylate or trimethylsiloxydimethylsilylpropyl (meth)acrylate.

The above silicon-containing styrene derivative may, for example, be a silicon-containing styrene derivative of the formula (III):

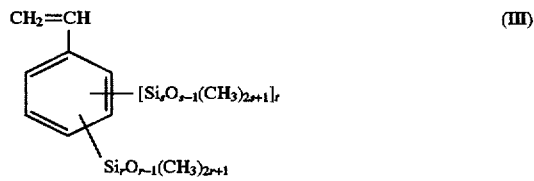

(III)

wherein s is an integer of from 1 to 15, t is 0 or 1, and r is an integer of from 1 to 15. In the silicon-containing styrene derivative of the formula (III), if s or r is an integer of 16 or higher, the synthesis or purification tends to be difficult, and the hardness of the resulting ocular lens material tends to be low. Further, if t is an integer of 2 or higher, the synthesis of such a silicon-containing styrene derivative tends to be difficult.

Typical examples of the silicon-containing styrene derivative of the above formula (III) include tris(trimethylsiloxy) silyl styrene, bis(trimethylsiloxy)methylsilyl styrene, dimethylsilyl styrene, trimethylsilyl styrene, tris (trimethylsiloxy)siloxanyldimethylsilyl styrene, [bis (trimethylsiloxy)methylsiloxanyl]dimethylsilyl styrene, pentamethyldisiloxanyl styrene, heptamethyltrisiloxanyl styrene, nonamethyltetrasiloxanyl styrene, pentadecamethylheptasiloxanyl styrene, heneicosamethyldecasiloxanyl styrene, heptacosamethyltridecasiloxanyl styrene, hentriacontamethylpentadecasiloxanyl styrene, trimethylsiloxypentamethyldisiloxymethylsilyl styrene, tris (pentamethyldisiloxy)silyl styrene, (tristrimethylsiloxy) siloxanylbis(trimethylsiloxy)silyl styrene, bis (heptamethyltrisiloxy)methylsilyl styrene, tris (methylbistrimethylsiloxysiloxy)silyl styrene, trimethylsiloxybis(tristrimethylsiloxysiloxy)silyl styrene, heptakis(trimethylsiloxy)trisiloxanyl styrene, tris (tristrimethylsiloxysiloxy)silyl styrene, (tristrimethylsiloxyhexamethyl)tetrasiloxy(tristrimethyl siloxy)siloxytrimethylsiloxysilyl styrene, nonakis (trimethylsiloxy)tetrasiloxanyl styrene, bis (tridecamethylhexasiloxy)methylsilyl styrene, heptamethylcyclotetrasiloxanyl styrene, heptamethylcyclotetrasiloxybis (trimethylsiloxy)silyl styrene, and tripropyltetramethylcyclotetrasiloxanyl styrene.

The above alkylvinyl silane may, for example, be trimethylvinyl silane.

Among the above silicon-containing monomers, tris (trimethylsiloxy)silylpropyl (meth)acrylate and tris (trimethylsiloxy)silyl styrene are particularly preferred, since they are excellent in the compatibility with other polymerizable components, and they have large effects for improving the oxygen permeability of the resulting ocular lens.

Such silicon-containing monomers may be used alone or in combination as a mixture of two or more of them. The amount of such a silicon-containing monomer may suitably be adjusted depending upon the nature of the desired ocular lens material. For example, when it is desired to obtain a low water-absorptive highly oxygen permeable ocular lens, in order to obtain adequate effects for improving the oxygen permeability, it is advisable to adjust the content of the silicon-containing monomer to a level of at least 5 wt %, preferably at least 10 wt %, more preferably at least 20 wt %, of the total amount of the polymerizable components. Further, in order to avoid deterioration of the compatibility with other polymerizable components, it is advisable to adjust the content to a level of at most 70 wt %, preferably at most 60 wt %, more preferably at most 50 wt %, of the total amount of the polymerizable components.

When it is desired to further improve the wettability (hydrophilic property) of the resulting ocular lens and to impart water absorptivity to the ocular lens, a hydrophilic monomer having a hydroxyl group, an amide group, a carboxyl group, an amino group, a glycol residue, a pyrrolidone structure or a morpholine structure, other than the above-mentioned hydroxyl group-containing monomer, may, for example, be used.

The above hydrophilic monomer may, for example, be an (alkyl)aminoalkyl (meth)acrylate such as 2-dimethylaminoethyl (meth)acrylate or 2-butylaminoethyl (meth)acrylate; an alkyl (meth)acrylamide such as N,N-dimethyl (meth)acrylamide; vinyl pyrrolidone; (meth) acrylic acid; maleic anhydride, fumaric acid; a fumaric acid derivative; amino styrene; or a morpholino compound of the formula (IV):

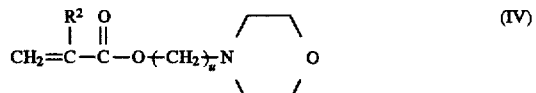

(IV)

wherein $R^2$ is a hydrogen atom or a methyl group, and u is an integer of from 1 to 12.

In the formula (IV) representing the above morpholino compound, u is an integer of from 1 to 12, and if u is an integer larger than 12, the alkylene chain will be long, and the hydrophobic moiety tends to increase too much, whereby such a morpholino compound tends to hardly provide adequate effects for imparting a hydrophilic property.

Typical examples of such a morpholino compound include morpholinomethyl (meth)acrylate and morpholinoethyl (meth)acrylate.

Among the above hydrophilic monomers, an alkyl (meth)acryloamide and (meth)acrylic acid are particularly preferred, since they are excellent in the compatibility with other polymerizable components, and they have large effects for improving the hydrophilic property of the resulting ocular lens.

Further, the above morpholino compound is preferred, since it not only imparts a proper hydrophilic property to the resulting ocular lens but is excellent in the compatibility with a hydrophobic component, particularly with a silicon-containing hydrophobic component, so that even when it is polymerized in admixture with such a hydrophobic component, the resulting polymer will be excellent in transparency without turbidity.

Further, when such a morpholino compound is used, a proper hydrophilic property will be imparted to the resulting ocular lens. Accordingly, even if the resulting ocular lens is, for example, a water non-absorptive material, a hydrophobic stain such as lipid tends to scarcely attach. Further, by properly adjusting the content of such a morpholino compound, the material may be made water-absorptive.

The above hydrophilic monomers may be used alone or in combination as a mixture of two or more of them. The amount of such a hydrophilic monomer may suitably be adjusted depending upon the nature of the desired ocular lens. For example, when it is desired to obtain a highly oxygen permeable ocular lens, in order to obtain adequate effects for improving the hydrophilic property or for imparting the water absorptivity, it is advisable to adjust the amount of the hydrophilic monomer to a level of at least 5 wt %, preferably at least 10 wt %, more preferably at least 20 wt %, of the total amount of the polymerizable components. Further, in order to avoid an excessive increase in the water absorptivity of the resulting ocular lens, it is advisable to adjust the amount to a level of at most 95 wt %, preferably at most 92 wt %, more preferably at most 90 wt %, of the total amount of the polymerizable components.

Further, when it is desired to have a crosslinked structure formed in the resulting ocular lens so as to improve the mechanical strength or durability of the ocular lens and to impart water resistance and solvent resistance to the ocular lens, it is preferred to employ a crosslinkable monomer which is a polyfunctional polymerizable compound having at least two copolymerizable unsaturated double bonds.

Such a crosslinkable monomer may, for example, be ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl acrylate, divinylbenzene, diallyl phthalate, diallyl adipate, triallyl isocyanurate, α-methylene-N-vinylpyrrolidone, 4-vinylbenzyl (meth)acrylate, 3-vinylbenzyl (meth)acrylate, 2,2-bis(p-(meth)acryloyloxyphenyl)hexafluoropropane, 2,2-bis(m-(meth)acryloyloxyphenyl)hexafluoropropane, 2,2-bis(o-(meth)acryloyloxyphenyl)hexafluoropropane, 2,2-bis(p-(meth)acryloyloxyphenyl)propane, 2,2-bis(m-(meth)acryloyloxyphenyl)propane, 2,2-bis(o-(meth)acryloyloxyphenyl)propane, 1,4-bis(2-(meth)acryloyloxyhexafluoroisopropyl)benzene, 1,3-bis(2-(meth)acryloyloxyhexafluoroisopropyl)benzene, 1,2-bis(2-(meth)acryloyloxyhexafluoroisopropyl)benzene, 1,4-bis(2-(meth)acryloyloxyisopropyl)benzene, 1,3-bis(2-(meth)acryloyloxyisopropyl)benzene, or 1,2-bis(2-(meth)acryloyloxyisopropyl)benzene.

Among the above crosslinkable monomers, ethylene glycol di(meth)acrylate is particularly preferred, since it is excellent in the compatibility with other polymerizable components, and it has large effects for improving the mechanical strength of the resulting ocular lens.

The above crosslinkable monomers may be used alone or in combination as a mixture of two or more of them. The amount of such a crosslinkable monomer may be suitably adjusted depending upon the nature of the desired ocular lens. For example, when it is desired to obtain a low water-absorptive highly oxygen permeable ocular lens, in order to obtain adequate effects for improving the mechanical strength, durability, water resistance, solvent resistance, etc., it is advisable to adjust the amount of the crosslinkable monomer to a level of at least 0.01 wt %, preferably at least 0.02 wt %, more preferably at least 0.05 wt %, of the total amount of the polymerizable components. Further, in order to avoid possible brittleness of the resulting ocular lens, it is advisable to adjust the amount to a level of at most 10 wt %, preferably at most 5 wt %, more preferably at most 3 wt %, of the total amount of the polymerizable components.

Further, when it is desired to impart deposit resistance to the resulting ocular lens, it is preferred to employ a fluorine-containing monomer which is a polymerizable compound having some of hydrogen atoms of a hydrocarbon group substituted by fluorine atoms.

Such a fluorine-containing monomer may, for example, be a monomer of the formula (V):

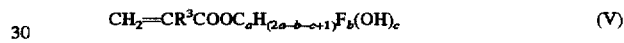

$$CH_2=CR^3COOC_aH_{(2a-b-c+1)}F_b(OH)_c \qquad (V)$$

wherein $R^3$ is a hydrogen atom or a methyl group, a is an integer of from 1 to 15, b is a integer of from 1 to (2a+1), and c is an integer of from 0 to 2.

Typical examples of the monomer of the above formula (V) include 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2',2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth)acrylate, 3,3,4,4,5,5,6,6,7,7,8,8,9,9,10,10,11,11,12,12-eicosafluorododecyl (meth)acrylate, 2-hydroxy-4,4,5,5,6,7,7,7-octafluoro-6-trifluoromethylheptyl (meth)acrylate, 2-hydroxy-4,4,5,6,6,7,7,8,9,9,9-dodecafluoro-8-trifluoromethylnonyl (meth)acrylate and 2-hydroxy-4,4,5,5,6,6,7,7,8,8,9,9,10,11,11,11-hexadecafluoro-10-trifluoromethylundecyl (meth)acrylate. Among the above fluorine-containing monomers, 2,2,2-trifluoroethyl (meth)acrylate and 2,2,2,2',2',2'-hexafluoroisopropyl (meth)acrylate are particularly preferred, since they have large effects for improving the deposit resistance of the resulting ocular lens material.

The above fluorine-containing monomers may be used alone or in combination as a mixture of two or more of them.

The amount of such a fluorine-containing monomer may suitably be adjusted depending upon the nature of the desired ocular lens. For example, when it is desired to obtain a low water-absorptive highly oxygen permeable ocular lens, in order to obtain adequate effects for improving the deposit resistance, it is advisable to adjust the amount of the fluorine-containing monomer to a level of at least 1 wt %, preferably at least 3 wt %, more preferably at least 5 wt %, of the total amount of the polymerizable components. Further, in order to avoid deterioration of the compatibility with other polymerizable components, it is advisable to adjust the amount to a level of at most 30 wt %, preferably at most 20 wt %, more preferably at most 15 wt %, of the total amount of the polymerizable components.

Further, to impart hardness or softness by adjusting the hardness of the resulting ocular lens, a hardness-adjusting monomer such as an alkyl (meth)acrylate or an alkyl styrene which is a polymerizable compound having an alkyl group, or styrene, may, for example, be used.

The above alkyl (meth)acrylate may, for example, be a linear, branched or cyclic alkyl (meth)acrylate, such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, n-pentyl (meth)acrylate, t-pentyl (meth)acrylate, hexyl (meth)acrylate, heptyl (meth)acrylate, nonyl (meth)acrylate, 2-ethylhexyl (meth)acrylate, n-octyl (meth)acrylate, n-decyl (meth)acrylate, n-dodecyl (meth)acrylate, stearyl (meth) acrylate, cyclopentyl (meth)acrylate or cyclohexyl (meth) acrylate; an alkoxyalkyl (meth)acrylate such as 2-ethoxyethyl (meth)acrylate, 3-ethoxypropyl (meth) acrylate, 2-methoxyethyl (meth)acrylate or 3-methoxypropyl (meth)acrylate; or an alkylthioalkyl (meth)acrylate such as ethylthioethyl (meth)acrylate or methylthioethyl (meth)acrylate.

The above alkyl styrene may, for example, be α-methyl styrene; an alkyl styrene such as methyl styrene, ethyl styrene, propyl styrene, butyl styrene, t-butyl styrene, isobutyl styrene or pentyl styrene; or an alkyl α-methyl styrene such as methyl-α-methyl styrene, ethyl-α-methyl styrene, propyl-α-methyl styrene, butyl-α-methyl styrene, t-butyl-α-methyl styrene, isobutyl-α-methyl styrene or pentyl-α-methyl styrene.

When it is desired to obtain, for example, a soft contact lens, it is preferred to employ, among such hardness-adjusting monomers, the one which, when formed into a homopolymer, will have a glass transition temperature (hereinafter referred to as Tg) of at most 40° C. Further, when it is desired to obtain a hard contact lens, it is preferred to employ the one which, when formed into a homopolymer, will have a Tg of higher than 40° C. Among them, an alkyl (meth)acrylate and an alkyl styrene are particularly preferred, since they are excellent in compatibility or copolymerizability with other polymerizable components.

The above hardness-adjusting monomers may be used alone or in combination as a mixture of two or more of them. The amount of such a hardness-adjusting monomer may suitably be adjusted depending upon the nature of the desired ocular lens material. For example, when it is desired to obtain a low water-absorptive highly oxygen permeable ocular lens, in order to obtain adequate effects for adjusting the hardness, it is advisable to adjust the amount of the hardness-adjusting monomer to a level of at least 1 wt %, preferably at least 3 wt %, more preferably at least 5 wt %, of the total amount of the polymerizable components. Further, to avoid a possibility such that the amount of other polymerizable components such as a hydroxyl group-containing compound will be relatively so small that no adequate effects for improving the wettability (hydrophilic property), the oxygen permeability or the transparency will be obtained, it is advisable to adjust the amount to a level of at most 80 wt %, preferably at most 75 wt %, more preferably at most 70 wt %, of the total amount of the polymerizable components.

Further, to impart ultraviolet absorptivity to the resulting ocular lens or to color the ocular lens, a polymerizable ultraviolet absorber, a polymerizable dyestuff or a polymerizable ultraviolet absorbing dyestuff may, for example, be used.

Specific examples of the polymerizable ultraviolet absorber include benzophenone type polymerizable ultraviolet absorbers such as 2-hydroxy-4-(meth) acryloyloxybenzophenone, 2-hydroxy-4-(meth) acryloyloxy-5-tert-butylbenzophenone, 2-hydroxy-4-(meth) acryloyloxy-2',4'-dichlorobenzophenone and 2-hydroxy-4-(2'-hydroxy-3'-(meth)acryloyloxypropoxy)benzophenone; benzotriazole type polymerizable ultraviolet absorbers such as 2-(2'-hydroxy-5'-(meth)acryloyloxyethylphenyl)-2H-benzotriazole, 2-(2'-hydroxy-5'-(meth) acryloyloxyethylphenyl)-5-chloro-2H-benzotriazole, 2-(2'-hydroxy-5'-(meth)acryloyloxypropylphenyl)-2H-benzotriazole and 2-(2'-hydroxy-5'-(meth) acryloyloxypropyl-3'-tert-butylphenyl)-5-chloro-2H-benzotriazole; salicylic acid derivative-type polymerizable ultraviolet absorbers such as phenyl 2-hydorxy-4-(meth) acryloyloxymethylbenzoate; and other polymerizable ultraviolet absorbers such as methyl 2-cyano-3-phenyl-3-(3'-(meth)acryloyloxyphenyl)propenoate. These polymerizable ultraviolet absorbers may be used alone or in combination as a mixture of two or more of them.

Specific examples of the polymerizable dyestuff include azo type polymerizable dyestuffs such as 1-phenylazo-4'-(meth)acryloyloxynaphthalene, 1-phenylazo-2-hydroxy-3'-(meth)acryloyloxynaphthalene, 1-naphthylazo-2-hydroxy-3'-(meth)acryloyloxynaphthalene, 1-(α-anthrylazo)-2-hydroxy-3'-(meth)acryloyloxynaphthalene, 1-((4'-(phenylazo)phenyl)azo)-2-hydroxy-3-(meth) acryloyloxynaphthalene, 1-(2',4'-xylylazo)-2-(meth) acryloyloxynaphthalene, 1-(o-tolylazo)-2-(meth) acryloyloxynaphthalene, 2-(m-(meth)acryloylamide-anilino)-4,6-bis(1'-(o-tolylazo)-2'-naphthylamino)-1,3,5-triazine, 2-(m-vinylanilino)-4-((4'-nitrophenylazo)-anilino)-6-chloro-1,3,5-triazine, 2-(1'-(o-tolylazo)-2'-naphthyloxy-4-(m-vinylanilino)-6-chloro-1,3,5-triazine, 2-(p-vinylanilino)-4-(1'-(o-tolylazo)-2'-naphthylamino)-6-chloro-1,3,5-triazine, N-(1'-(o-tolylazo)-2'-naphthyl)-3-vinylphthalic acid monoamide, N-(1'-(o-tolylazo)-2'-naphthyl)-6-vinylphthalic acid monoamide, 3-vinylphthalic acid-(4'-(p-sulfophenylazo)-1'-naphthyl)monoester, 6-vinylphthalic acid-(4'-(p-sulfophenylazo)-1'-naphthyl)monoester, 3-(meth)acryloylamide-4-phenylazophenol, 3-(meth) acryloylamide-4-(8'-hydroxy-3',6'-disulfo-1'-naphthylazo) phenol, 3-(meth)acryloylamide-4-(1'-phenylazo-2'-naphthylazo)phenol, 3'-(meth)acryloylamide-4-(p-tolylazo) phenol, 2-amino-4-(m-(2'-hydroxy-1'-naphthylazo)anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1'-phenylazo)anilino)-6-isopropenyl-1,3,5-triazine, 2-amino-4-(N-methyl-p-(4'-hydroxyphenylazo)anilino)-6-isopropenyl-1,3,5-triazine, 2-amino-4-(m-(3'-methyl-1'-phenyl-5'-hydroxy-4'-pyrazolylazo)anilino)-6-isopropenyl-1,3,5-triazine, 2-amino-4-(N-methyl-p-(3'-methyl-1'-phenyl-5'-hydroxy-4'-pyrazolylazo)anilino)-6-isopropenyl-1,3,5-triazine, 2-amino-4-(p-phenylazoanilino)-6-isopropenyl-1,3,5-triazine and 4-phenylazo-7-(meth)acryloylamide-1-naphthol; anthraquinone type polymerizable dyestuffs such as 1,5-bis((meth)acryloylamino)-9,10-anthraquinone, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)- 9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1,4-bis-(4'-vinylbenzoylamide)-9,10-anthraquinone, 1,4-bis-(4'-isopropenylbenzoylamide)-9,10-anthraquinone, 1,5-bis-(4'-vinylbenzoylamide)-9,10-anthraquinone, 1,5-bis-(4'-isopropenylbenzoylamide)-9,10-anthraquinone, 1-methylamino-4-(3'-vinylbenzoylamide)-9,10-anthraquinone, 1-methylamino-4-(4'-vinylbenzoyloxyethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-amino-4-(3'-(meth)acryloylaminophenylamino)-9,10-anthraquinone-2-sulfonic acid, 1-amino-4-(31-(meth) acryloylaminobenzylamino)-9,10-anthraquinone-2-sulfonic acid, 1-(β-ethoxycarbonylallylamino)-9,10-anthraquinone, 1-(β-carboxyallylamino)-9,10-anthraquinone, 1,5-di-(β-carboxyallylamino)-9,10-anthraquinone, 1-(β-isopropoxycarbonylallylamino)-5-benzoylamide-9,10-anthraquinone, 2-(3'-(meth)acryloylamide-anilino)-4-(3'-(3"-sulfo- 4 "-aminoanthraquinon-1"-yl)amino-anilino)-6-chloro-1,3,5-triazine, 2-(3'-(meth)acryloylamide-anilino)-4-(3'-(3"-sulfo-4"-aminoanthraquinon-1"-yl)amino-anilino)-6-hydrazino-1,3,5-triazine, 2,4-bis-((4"-methoxyanthraquinon-1"-yl)amino)-6-(3'-vinylanilino)-1,3,5-triazine and 2-(2'-vinylphenoxy)-4-(4'-(3"-sulfo-4'-aminoanthraquinon-1"-yl-amino)anilino)-6-chloro-1,3,5-triazine; nitro type polymerizable dyestuffs such as o-nitroanilinomethyl (meth)acrylate; and phthalocyanine type polymerizable dyestuffs such as (meth)acryloyl-modified tetraamino copper phthalocyanine and (meth) acryloyl-modified (dodecanoyl-modified tetraamino copper phthalocyanine). These polymerizable dyestuffs may be used alone or in combination as a mixture of two or more of them.

Specific examples of the polymerizable ultraviolet absorbing dyestuff include benzophenone type polymerizable ultraviolet absorbing dyestuffs such as 2,4-dihydroxy-3-(p-styrenoazo)benzophenone, 2,4-dihydroxy-5-(p-styrenoazo)benzophenone, 2,4-dihydroxy-3-(p-(meth) acryloyloxymethylphenylazo)benzophenone, 2,4-dihydroxy-5-(p-(meth)acryloyloxymethylphenylazo)-benzophenone, 2,4-dihydroxy-3-(p-(meth) acryloyloxyethylphenylazo)benzophenone, 2,4-dihydroxy-5-(p-(meth)acryloyloxyethylphenylazo)-benzophenone, 2,4-dihydroxy-3-(p-(meth)acryloyloxypropylphenylazo) benzophenone, 2,4-dihydroxy- 5-(p-(meth) acryloyloxypropylphenylazo)-benzophenone, 2,4-dihydroxy-3-(o-(meth)acryloyloxymethylphenylazo) benzophenone, 2,4-dihydroxy-5-(o-(meth) acryloyloxymethylphenylazo)-benzophenone, 2,4-dihydroxy-3-(o-(meth)acryloyloxyethylphenylazo) benzophenone, 2,4-dihydroxy-5-(o-(meth) acryloyloxyethylphenylazo)-benzophenone, 2,4-dihydroxy-3-(o-(meth)acryloyloxypropylphenylazo)benzophenone, 2,4-dihydroxy-5-(o-(meth)acryloyloxypropylphenylazo)-benzophenone, 2,4-dihydroxy-3-(p-(N,N-di(meth) acryloyloxyethylamino)phenylazo)benzophenone, 2,4-dihydroxy-5-(p-(N,N-di(meth)acryloyloxyethylamino) phenylazo)benzophenone, 2,4-dihydroxy-3-(o-(N,N-di (meth)acryloyloxyethylamino)phenylazo)benzophenone, 2,4-dihydroxy-5-(o-(N,N-di(meth)acryloylethylamino) phenylazo)benzophenone, 2,4-dihydroxy-3-(p-(N-ethyl-N-(meth)acryloyloxyethylamino)phenylazo)benzophenone, 2,4-dihydroxy-5-(p-(N-ethyl-N-(meth) acryloyloxyethylamino)phenylazo)benzophenone, 2,4-dihydroxy-3-(o-(N-ethyl-N-(meth)acryloyloxyethylamino) phenylazo)benzophenone, 2,4-dihydroxy-5-(o-(N-ethyl-N-(meth)acryloyloxyethylamino)phenylazo)benzophenone, 2,4-dihydroxy-3-(p-(N-ethyl-N-(meth)acryloylamino) phenylazo)benzophenone, 2,4-dihydroxy-5-(p-(N-ethyl-N-(meth)acryloylamino)phenylazo)benzophenone, 2,4-dihydroxy-3-(o-(N-ethyl-N-(meth)acryloylamino) phenylazo)benzophenone and 2,4-dihydroxy-5-(o-(N-ethyl-N-(meth)acryloylamino)phenylazo)benzophenone; and benzoic acid type polymerizable ultraviolet absorbing dyestuffs such as phenyl 2-hydroxy-4-(p-styrenoazo)benzoate. These polymerizable ultraviolet absorbing dyestuffs may be used alone or in combination as a mixture of two or more of them.

The amount of the above polymerizable ultraviolet absorber, polymerizable dyestuff or polymerizable ultraviolet absorbing dyestuff, may suitably be adjusted depending upon the nature and the thickness of the desired ocular lens, and it is preferably at most 3 wt %, more preferably from 0.1 to 2 wt %, of the total amount of the polymerizable components. If the amount is too much, the physical properties of the ocular lens, such as mechanical strength, tend to deteriorate. Further, in consideration of the toxicity of the ultraviolet absorber or dyestuff, such an excessive amount tends to be unsuitable as a material for ocular lenses such as contact lenses which are in direct contact with living tissues or intraocular lenses embedded in living bodies. Further, particularly in the case of a dyestuff, if the amount is too much, the color of the lens tends to be so deep that the transparency decreases, and visible rays tend to be hardly transmitted through the lens.

In the present invention, among the above polymerizable monomers, one or more monomers other than polysiloxane macromonomers, may be selected and formed into a macromonomer, which is then incorporated, as one of the polymerizable monomers, to the polymerizable components.

The polymerizable components comprising the hydroxyl group-containing compound and the optional polymerizable monomers, are suitably adjusted and subjected to polymerization depending upon the particular use of the desired ocular lens such as a contact lens or an intraocular lens.

In the present invention, the polymerization can be carried out by a conventional method by adjusting the amounts of the polymerizable components comprising the hydroxyl group-containing compound and the optional polymerizable monomers within the ranges of the above-mentioned respective amounts and adding e.g. a radical polymerization initiator thereto, to obtain a hydroxyl group-containing polymer.

The conventional method is, for example, a method wherein a radial polymerization initiator is added, followed by gradual heating within a temperature range of from room temperature to about 130° C. (heat polymerization) or by irradiation of an electromagnetic wave such as a microwave, ultraviolet rays or a radiation (such as γ-rays). In the case of heat polymerization, the temperature may be raised stepwise. The polymerization may be carried out by a bulk polymerization method or a solution polymerization method employing e.g. a solvent, or by other methods.

Typical examples of the above-mentioned radical polymerization initiator include azobisisobutyronitrile, azobisodimethylvaleronitrile, benzoyl peroxide, t-butyl hydroperoxide and cumene hydroperoxide. These initiators may be used alone or in combination as a mixture of two or more of them.

In a case where the polymerization is carried out by means of e.g. light rays, it is preferred to further incorporate a photopolymerization initiator or a sensitizer. The amount of such a photopolymerization initiator or a sensitizer is usually from 0.001 to 2 parts by weight, preferably from 0.01 to 1 part by weight, per 100 parts by weight of the total amount of the polymerizable components.

To shape the hydroxyl group-containing polymer into an ocular lens shape such as a contact lens shape or an intraocular lens shape, conventional shaping methods which are commonly used in this field can be employed. Such conventional methods include, for example, a cutting method and a cast molding method. The cutting method is a method wherein, after carrying out polymerization in a suitable mold or container to obtain a base material (polymer) of a rod, block or plate shape, such a base material is processed into a desired shape by mechanical processing such as cutting, grinding or polishing. The cast molding method is a method wherein a mold corresponding to the shape of a desired ocular lens, is prepared, and polymerization of the above-mentioned polymerizable components is carried out in this mold to obtain a molded product, which may further be subjected to mechanical finishing as the case requires. Further, a combination of such a cutting method and a cast molding method, may also be employed.

When it is desired to obtain the hydroxyl group-containing polymer shaped to have an ocular lens shape, as a polymer which is soft at a temperature around room temperature, it is usually preferred to employ a cast molding method as the shaping method. Such a casting method may, for example, be a spin casting method or a static casting method.

Apart from these methods, a method may preferably be applied to the present invention wherein a monomer capable of forming a hard polymer is impregnated to a soft hydroxyl group-containing polymer, followed by polymerization of the monomer to harden the entire material, which is then subjected to cutting, grinding and polishing to obtain a shaped polymer having a desired shape, and then the hard polymer is removed therefrom to obtain a shaped polymer made of the soft material (JP-A-62-2780241, JP-A-1-11854).

Further, to prepare an intraocular lens, the lens and the support for the lens may separately be prepared, and they may be later bonded to each other. Otherwise, the support portion may be simultaneously (integrally) molded with the lens. The above bonding of the lens and the support for the lens may be carried out either before or after the reaction of such lens and support (polymer) with the silicon-containing compound.

The ocular lens of the present invention is obtained by reacting the hydroxyl group-containing polymer shaped to have an ocular lens shape, as described above, with a silicon-containing compound of the formula (I):

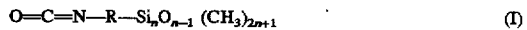

wherein $R^1$ is a $C_{1-6}$ linear or branched alkylene group, and n is an integer of from 1 to 15.

The silicon-containing compound of the formula (I) has two polar groups and contains an isocyanate group in its structure. Accordingly, the isocyanate group is reacted with the hydroxyl group in the hydroxyl group-containing polymer shaped to have an ocular lens shape, to form a urethane bond, whereby excellent wettability will be imparted to the ocular lens, as mentioned above.

The above silicon-containing compound contains a silicon atom in its structure, whereby excellent oxygen permeability will be imparted to the finally obtainable ocular lens.

In the above formula (I) representing the silicon-containing compound, $R^1$ is a $C_{1-6}$ linear or branched alkylene group. However, taking into consideration compatibility of the hydroxyl group-containing polymer with a solvent in a case where such a solvent is used for the reaction, $R^1$ is preferably a $C_{2-4}$ linear or branched alkylene group. If the carbon number of the alkylene group is 7 or more, the viscosity of the silicon-containing compound increases, and its handling tends to be difficult, such being undesirable.

In the formula (I), n is an integer of from 1 to 15. However, taking into consideration compatibility of the hydroxyl group-containing polymer with a solvent in a case where such a solvent is used for the reaction, n is preferably an integer of from 2 to 10, more preferably an integer of from 3 to 6. If n is 16 or more, the viscosity of the silicon-containing compound increases, and its handling tends to be difficult, such being undesirable.

Specific examples of the silicon-containing compound include silicon-containing isocyanates, such as trimethylsilylmethyl isocyanate, trimethylsilylpropyl isocyanate, pentamethyldisiloxanylmethyl isocyanate, trimethylsiloxydimethylsilylpropyl isocyanate, methylbis(trimethylsiloxy)silylpropyl isocyanate, tris(trimethylsiloxy)silylpropyl isocyanate, mono[methylbis(trimethylsiloxy)siloxy]bis(trimethyl siloxy)silylpropyl isocyanate and tris[methylbis(trimethylsiloxy)siloxy]silylpropyl isocyanate. These compounds may be used alone or in combination as a mixture of two or more of them.

When the hydroxyl group-containing polymer shaped to have an ocular lens shape is reacted with the silicon-containing compound, the proportions of the two reactants cannot generally be defined since they vary depending upon e.g. the amount of hydroxyl groups contained in the hydroxyl group-containing polymer or the composition of such a hydroxyl group-containing polymer. However, to ensure that urethane bonds are sufficiently formed and not only excellent wettability but also excellent oxygen permeability will be imparted to the resulting ocular lens, the isocyanate groups in the silicon-containing compound are preferably adjusted to be at least 5 mol, preferably at least 20 mol, per 100 mol of the hydroxyl groups in the hydroxyl group-containing polymer. Further, taking the productivity into consideration, the proportions of the two reactants are preferably adjusted so that the isocyanate groups in the silicon-containing compound will be at most 500 mol, preferably at most 100 mol, per 100 mol of the hydroxyl groups in the hydroxyl group-containing polymer.

In the hydroxyl group-containing polymer shaped to have an ocular lens shape, hydroxyl groups may be contained in such an amount which is sufficient for forming urethane bonds adequate for imparting excellent wettability to the resulting ocular lens. Such an amount of hydroxyl groups in the hydroxyl group-containing polymer may be estimated from the amount of the hydroxyl group-containing monomer used for obtaining the hydroxyl group-containing polymer, as mentioned above. In a case where the amount of hydroxyl groups in such a hydroxyl group-containing polymer is relatively small, it is preferred to use the silicon-containing compound in an amount such that the amount of isocyanate groups will be at least equal to the amount of the hydroxyl groups, so that all hydroxyl groups may be reacted. On the other hand, in a case where the hydroxyl group-containing polymer is a polymer which has a relatively large amount of hydroxyl groups in the hydroxyl group-containing polymer, such as a polymer obtained by polymerizing a polymerizable component containing almost 100 wt % of the hydroxyl group-containing monomer, the silicon-containing compound may be used in an amount such that the amount of isocyanate groups will be equimolar to the predetermined amount of hydroxyl groups, so that only a part of the hydroxyl groups i.e. not all of the hydroxyl groups, will react with isocyanate groups, and the rest of hydroxyl groups will remain unreacted.

Taking into consideration the reproducibility of the reaction due to easy control of the reaction or the effects for imparting excellent wettability, it is preferred to use the silicon-containing compound so that the amount of isocyanate groups will be in excess relative to the amount to the hydroxyl groups, so that all hydroxyl groups will be reacted with isocyanate groups to form urethane bonds.

When the hydroxyl group-containing polymer shaped to have an ocular lens shape is reacted with the silicon-containing compound, it is preferred to employ a catalyst to let the reaction proceed smoothly.

As such a catalyst, a tin type compound such as dibutyltin dilaurate, or an amine type compound such as triethylamine, may be mentioned, and the amount of the catalyst may be suitably adjusted for use.

The reaction of the hydroxyl group-containing polymer shaped to have an ocular lens shape with the silicon-containing compound may be carried out, for example, by using the above-mentioned catalyst at a suitable temperature for a proper period in the same manner as for a usual bulk polymerization reaction. However, in order to further increase the conversion and to react also hydroxyl groups in the interior of the hydroxyl group-containing polymer more uniformly with isocyanate groups, it is preferred that the hydroxyl group-containing polymer is preliminarily swelled with a solvent and then reacted with the silicon-containing compound.

As such a solvent, there is no particular limitation so long as it is capable of swelling the hydroxyl group-containing polymer. For example, an organic solvent such as dimethylformamide, tetrahydrofuran, dimethylsulfoxide, n-hexane or ethyl acetate may be preferably employed.

In the case where the hydroxyl group-containing polymer shaped to have an ocular lens shape is preliminarily swelled with a solvent, it is advisable to employ a hydroxyl group-containing polymer having a crosslinked structure, for example, one obtained by polymerizing polymerizable components containing the above-mentioned crosslinkable monomer, in order to avoid a possibility that the hydroxyl group-containing polymer is dissolved in the solvent.

When a solvent is used for carrying out the reaction of the two reactants, the hydroxyl group-containing polymer may usually be immersed for swelling in the solvent, and then a catalyst may, for example, be added and further the silicon-containing compound is added to carry out the reaction at a suitable reaction temperature for a suitable reaction time.

The reaction temperature and the reaction time are not particularly limited. The reaction temperature may vary depending upon the type of the solvent and may usually be at a level lower than the boiling point of the solvent. For example, when dimethylformamide is employed, such a reaction temperature is preferably at a level of from 10 to 50° C. The reaction time can not generally be defined, as it varies depending upon the reaction temperature or the progress of the reaction, but it is usually preferably at a level of from 1 to 36 hours.

Whether or not the reaction of the hydroxyl group-containing polymer shaped to have an ocular lens shape with the silicon-containing compound, has been completed, can be determined by comparing the infrared absorption spectrum of the hydroxyl group-containing polymer before the reaction with the infrared absorption spectrum of the product after the reaction to see if the absorption attributable to the hydroxyl groups has disappeared and the absorption attributable to urethane bonds is present, and to see if the absorption attributable to N=C=O has disappeared.

As described above, according to the method of the present invention, even if the finally obtainable ocular lens is essentially soft and hardly mechanically processable, if the hydroxyl group-containing polymer before the reaction with the silicon-containing compound is essentially hard enough to be mechanically processable, it is possible to readily produce an ocular lens having a desired shape by preliminarily applying mechanical processing to such a polymer. The ocular lens of the present invention obtained by such a method is excellent not only in transparency, but also excellent in wettability and oxygen permeability, as is different from conventional ocular lenses.

Now, the ocular lens of the present invention and the method for its production will be described in further detail with reference Examples. However, it should be understood that the present invention is by no means restricted to such specific Examples.

EXAMPLE 1

100 parts by weight of 2-hydroxylethyl methacrylate and 0.3 part by weight of ethylene glycol dimethacrylate as polymerizable components, were mixed with 0.1 part by weight of 2,2'-azobis(2,4-dimethylvaleronitrile), as a polymerization initiator. The obtained mixture was transferred to a test tube, and the inner atmosphere was substituted by nitrogen gas. The test tube was then sealed.

Then, the sealed test tube was immersed in a circulation system constant temperature water tank, whereupon polymerization was carried out at 35° C. for 40 hours and at 50° C. for 8 hours. The test tube was then transferred to a circulation system drier and heated from 60 to 120° C. for 14 hours while raising the temperature at a rate of 10° C. per 2 hours and at 110° C. for 2 hours, to complete the polymerization to obtain a colorless transparent hydroxyl group-containing polymer.

The obtained hydroxyl group-containing polymer was subjected to mechanical processing by cutting, grinding and polishing to obtain a test specimen having a diameter of 15 mm and a thickness of 0.2 mm. The processability of the polymer at that time was excellent.

The obtained test specimen was visually inspected, whereby it was transparent without any fogging and free from optical strain, and it was suitable for use as an ocular lens.

Further, the above test specimen was subjected to cutting, grinding and polishing to obtain a test specimen having a contact lens shape. The cutting surface and the polished surface of such a test specimen having a contact lens shape were excellent.

Then, the obtained specimen having a contact lens shape was immersed and swelled in dimethylformamide. Then, 0.001 mol of dibutyltin dilaurate was added as a catalyst, and 0.1 mol of tris(trimethylsiloxy)silylpropyl isocyanate was added thereto, whereupon the reaction was completed by immersing the mixture in a constant temperature water tank at 35° C. for 16 hours. Then, the test specimen subjected to the reaction, was immersed in fresh dimethylformamide to wash off unreacted tris(trimethylsiloxy)silylpropyl isocyanate from the test specimen. Finally, dimethylformamide in the test specimen was substituted by a physiological sodium chloride aqueous solution to obtain a contact lens.

The amount of the above tris(trimethylsiloxy)silylpropyl isocyanate used, was in excess to the amount of hydroxyl groups in the hydroxyl group-containing polymer, which was estimated from the blend proportion of the hydroxyl group-containing monomer in the polymerizable components.

After completion of the reaction, with respect to the obtained contact lens, the infrared absorption spectrum was measured by a KBr tablet method by means of FT-IR8300 and compared with the infrared absorption spectrum of the hydroxyl group-containing polymer preliminarily measured by means of FR-IR8300. As a result, in the infrared absorption spectrum of the hydroxyl group-containing polymer, the absorption attributable to a hydroxyl group was observed in the vicinity of 3,430 $cm^{-1}$, while in the infrared absorption spectrum of the contact lens, no such absorption attributable to a hydroxyl group was observed in the vicinity of 3,430 $cm^{-1}$, and the absorption attributable to Si—O—Si was observed in the vicinity of 1,058 $cm^{-1}$, the absorption attributable to $(CH_3)_3$—SiO— was observed in the vicinity of 843 $cm^{-1}$ and the absorption attributable to a urethane bond was observed in the vicinity of 3,400 $cm^{-1}$. Thus, it was confirmed that the hydroxyl group-containing polymer and the silicon-containing compound were reacted.

Then, the oxygen permeation coefficient and the contact angle of the above contact lens were measured in accordance with the following methods. The results are shown in Table 1.

(a) Oxygen permeation coefficient ($DK_{O_2}$)

Using a Seikaken Model film oxygen permeation meter manufactured by Rikaseiki Kogyo K.K., the oxygen permeation coefficient of the contact lens was measured in a physiological sodium chloride aqueous solution at 35° C. The unit of the oxygen permeation coefficient is ml (STP) ·$cm^2$/($cm^3$·sec·mmHg), and the oxygen permeation coefficient in Table 1 is a numerical value obtained by multiplying $10^{11}$ by the value of the oxygen permeation coefficient when the thickness of the test specimen is 0.2 mm.

(b) Contact angle

Contact angle (degree) was measured by a bubble method at a temperature of 25° C. by means of a goniometer.

EXAMPLES 2 TO 21

A colorless transparent hydroxyl group-containing polymer was prepared in the same manner as in Example 1 except that in Example 1, the polymerizable components to obtain a hydroxyl group-containing polymer were changed as shown in Table 1.

From the obtained hydroxyl group-containing polymer, a test specimen was prepared in the same manner as in Example 1. The processability of the polymer in each of Examples 2 to 21 was excellent.

The obtained test specimen was visually inspected. The test specimens of Examples 2 to 21 were transparent without fogging and free from optical strain, and they were suitable for use as ocular lenses.

Further, the test specimens were subjected to cutting, grinding and polishing to obtain contact lens-shaped test specimens. The cutting surface and the polishing surface of each of the contact lens-shaped test specimens were excellent.

Then, in the same manner as in Example 1, the reaction of the contact lens-shaped test specimens with tris (trimethylsiloxy)silylpropyl isocyanate was completed, and unreacted tris(trimethylsiloxy)silylpropyl isocyanate was washed off from the test specimens. Finally, dimethylformamide in the test specimens was substituted by a physiological sodium chloride aqueous solution to obtain contact lenses.

The amount of the above tris(trimethylsiloxy)silylpropyl isocyanate used, was in excess to the amount of hydroxyl groups in the hydroxyl group-containing polymer which was estimated from the blend proportion of the hydroxyl group-containing monomer in the polymerizable components, in the same manner as in Example 1.

After completion of the reaction, with respect to each of the obtained contact lenses, the infrared absorption spectrum was measured and compared with the infrared absorption spectrum of each hydroxyl group-containing polymer preliminarily measured, in the same manner as in Example 1. As a result, in the infrared absorption spectrum of each hydroxyl group-containing polymer, the absorption attributable to a hydroxyl group was observed in the vicinity of 3,430 $cm^{-1}$, while in the infrared absorption spectrum of each contact lens, no such absorption attributable to a hydroxyl group was observed in the vicinity of 3,430 $cm^{-1}$, and the absorption attributable to Si—O—Si was observed in the vicinity of 1,058 $cm^{-1}$, the absorption attributable to $(CH_3)_3$—SiO— was observed in the vicinity of 843 $cm^{-1}$, and the absorption attributable to a urethane bond was observed in the vicinity of 3,400 $cm^{-1}$. Thus, it was confirmed that the hydroxyl group-containing polymer and the silicon-containing compound were reacted.

Then, the oxygen permeation coefficients and the contact angles of the contact lenses were measured in the same manner as in Example 1. The results are shown in Table 1.

EXAMPLE 22

100 parts by weight of 2-hydroxylethyl acrylate and 0.3 part by weight of ethylene glycol dimethacrylate, as polymerizable components, were mixed with 2,2'-azobis(2,4-dimethylvaleronitrile), as a polymerization initiator. The obtained mixture was filled into a casting mold comprising a male mold and a female mold having a shape corresponding to a contact lens.

Then, ultraviolet rays having a wavelength of 360 nm were irradiated to the above casting mold for 30 minutes by means of a black light to polymerize the above mixture. Then, the molded product was released from the mold to obtain a colorless transparent contact lens-shaped hydroxyl group-containing polymer (test specimen).

Then, in the same manner as in Example 1, the reaction of the contact lens-shaped test specimen with tris (trimethylsiloxy)silylpropyl isocyanate was completed, and unreacted tris(trimethylsiloxy)silylpropyl isocyanate was washed off from the test specimen. Finally, dimethylformamide in the test specimen was substituted by a physiological sodium chloride aqueous solution to obtain a contact lens.

The amount of the above tris(trimethylsiloxy)silylpropyl isocyanate used, was in excess to the amount of the hydroxyl groups in the hydroxyl group-containing polymer which was estimated from the blend proportion of the hydroxyl group-containing monomer in the polymerizable components, in the same manner as in Example 1.

After completion of the reaction, with respect to the obtained contact lens, the infrared absorption spectrum was measured and compared with the infrared absorption spectrum of the hydroxyl group-containing polymer preliminarily measured, in the same manner as in Example 1. As a result, in the infrared absorption spectrum of the hydroxyl group-containing polymer, the absorption attributable to a hydroxyl group was observed in the vicinity of 3,430 cm$^{-1}$, while in the infrared absorption spectrum of the contact lens, no such absorption attributable to a hydroxyl group was observed in the vicinity of 3,430 cm$^{-1}$, and the absorption attributable to Si—O—Si was observed in the vicinity of 1,058 cm$^{-1}$, the absorption attributable to (CH$_3$)$_3$—SiO— was observed in the vicinity of 843 cm$^{-1}$ and the absorption attributable to the urethane bond was observed in the vicinity of 400 cm$^{-1}$. Thus, it was confirmed that the hydroxyl group-containing polymer and the silicon-containing compound were reacted.

Further, the obtained contact lens was visually inspected, and it was found to be transparent without fogging and free from optical strain, and it was suitable for use as as ocular lens.

Then, the oxygen permeation coefficient and the contact angle of the above contact lens were measured in the same manner as in Example 1. The results are shown in Table 1.

COMPARATIVE EXAMPLE 1

A polymer was prepared in the same manner as in Example 1 except that in Example 1, 100 parts by weight of tris(trimethylsiloxy)silylpropyl methacrylate and 0.3 part by weight of ethylene glycol dimethacrylate were used as polymerizable components.

The obtained polymer was subjected to mechanical processing by cutting, grinding and polishing to obtain a contact lens having a diameter of 15 mm and a thickness of 0.2 mm.

The oxygen permeation coefficient and the contact angle of the obtained contact lens were measured in the same manner as in Example 1. The results are shown in Table 1.

COMPARATIVE EXAMPLE 2

A polymer was prepared in the same manner as in Example 1 except that in Example 1, 100 parts by weight of 2-hydroxyethyl methacrylate and 0.3 part by weight of ethylene glycol dimethacrylate were used as polymerizable components.

The obtained polymer was subjected to mechanical processing by cutting, grinding and polishing and then to hydration treatment to obtain a contact lens having a diameter of 15 mm and a thickness of 0.2 mm.

The oxygen permeation coefficient and the contact angle of the obtained contact lens were measured in the same manner as in Example 1. The results are shown in Table 1.

COMPARATIVE EXAMPLE 3

A polymer was prepared in the same manner as in Example 1 except that in Example 1, 100 parts by weight of 2-hydroxyethyl acrylate and 0.3 part by weight of ethylene glycol dimethacrylate were used as polymerizable components.

The obtained polymer was subjected to mechanical processing by cutting, grinding and polishing and then to hydration treatment to obtain a contact lens having a diameter of 15 mm and a thickness of 0.2 mm.

The oxygen permeation coefficient and the contact angle of the obtained contact lens were measured in the same manner as in Example 1. The results are shown in Table 1.

The abbreviations in Table 1 represent the following compounds.

2HEMA: 2-Hydroxyethyl methacrylate
2HEA: 2-Hydroxyethyl acrylate
DMAA: N,N-Dimethylacrylamide
NVP: N-Vinyl pyrrolidone
MMA: Methyl methacrylate
BuA: Butyl acrylate
EDMA: Ethylene glycol dimethacrylate
AMA: Allyl methacrylate
TTMSSPMA: Tris(trimethylsiloxy)silylpropyl methacrylate
VM: Vinyl methacrylate
VA: Vinyl acrylate

TABLE 1

| | Polymerizable components for polymer (parts by weight) | | | | | | | | | | | Physical properties of contact lens | |
|---|---|---|---|---|---|---|---|---|---|---|---|---|---|
| | | | | | | | | | | | | Oxygen permeation coefficient | Contact angle |
| Example No. | 2HEMA | 2HEA | DMAA | NVP | MMA | BuA | EDMA | AMA | TTMSSPMA | VM | VA | (DK$_{o2}$) | (degree) |
| 1 | 100 | — | — | — | — | — | 0.3 | — | — | — | — | 62 | 60 |
| 2 | 75 | — | 25 | — | — | — | 0.3 | — | — | — | — | 47 | 45 |
| 3 | 50 | — | 50 | — | — | — | 0.3 | — | — | — | — | 35 | 35 |
| 4 | 25 | — | 75 | — | — | — | 0.3 | — | — | — | — | 45 | 25 |
| 5 | 75 | — | — | — | 25 | — | 0.3 | — | — | — | — | 68 | 60 |
| 6 | 50 | — | — | — | 50 | — | 0.3 | — | — | — | — | 64 | 63 |
| 7 | 25 | — | — | — | 75 | — | 0.3 | — | — | — | — | 24 | 65 |
| 8 | 75 | — | — | — | — | 25 | 0.3 | — | — | — | — | 65 | 60 |
| 9 | 50 | — | — | — | — | 50 | 0.3 | — | — | — | — | 53 | 63 |
| 10 | 25 | — | — | — | — | 75 | 0.3 | — | — | — | — | 48 | 65 |
| 11 | 10 | — | — | 90 | — | — | — | 0.05 | — | — | — | 65 | 30 |
| 12 | — | 10 | — | 90 | — | — | — | 0.1 | — | — | — | 65 | 28 |
| 13 | — | 19 | — | 81 | — | — | — | 0.3 | — | — | — | 70 | 31 |
| 14 | — | 19 | — | 81 | — | — | — | 1.0 | — | — | — | 75 | 32 |
| 15 | — | 19 | — | 81 | — | — | — | 3.0 | — | — | — | 72 | 33 |
| 16 | — | 19 | — | 81 | — | — | — | — | — | 0.7 | — | 75 | 32 |

TABLE 1-continued

| Example No. | Polymerizable components for polymer (parts by weight) | | | | | | | | | | | Physical properties of contact lens | |
|---|---|---|---|---|---|---|---|---|---|---|---|---|---|
| | 2HEMA | 2HEA | DMAA | NVP | MMA | BuA | EDMA | AMA | TTMSSPMA | VM | VA | Oxygen permeation coefficient ($DK_{0.2}$) | Contact angle (degree) |
| 17 | — | 19 | — | 81 | — | — | — | — | — | 1.0 | — | 75 | 32 |
| 18 | — | 19 | — | 81 | — | — | — | — | — | — | 0.7 | 73 | 32 |
| 19 | 11 | 10 | — | 79 | — | — | — | 1.0 | — | — | — | 84 | 35 |
| 20 | 11 | 10 | — | 79 | — | — | — | — | — | 0.7 | — | 85 | 35 |
| 21 | 11 | 10 | — | 79 | — | — | — | — | — | — | 0.7 | 85 | 35 |
| 22 | — | 100 | — | — | — | — | 0.3 | — | — | — | — | 65 | 60 |
| Comparative Example 1 | — | — | — | — | — | — | 0.3 | — | 100 | — | — | 120 | 110 |
| Comparative Example 2 | 100 | — | — | — | — | — | 0.3 | — | — | — | — | 10 | 26 |
| Comparative Example 3 | — | 100 | — | — | — | — | 0.3 | — | — | — | — | 12 | 25 |

It is evident from the results shown in Table 1 that the contact lenses obtained in Examples 1 to 22 have high oxygen permeation coefficients and low contact angles, thus indicating that they are excellent in both oxygen permeability and wettability.

Whereas, the contact lens obtained in Comparative Example 1 which was made of a polymer obtained by simply polymerizing a silicon-containing alkyl methacrylate without using a hydroxyl group-containing polymer, has a contact angle which is as large as 110°, thus indicating that it is very poor in wettability, although the oxygen permeation coefficient was high. Further, the contact lenses obtained in Comparative Examples 2 and 3 which were made of a hydroxyl group-containing polymer not reacted with a silicon-containing compound, have oxygen permeation coefficients which are very low, thus indicating that they are very poor in the oxygen permeability, although the contact angles are small.

As described in the foregoing, the ocular lens of the present invention is excellent not only in transparency but also in oxygen permeability and wettability, and when used as a contact lens, it can be put on over a long period of time without impairing the metabolic function of cornea, and by virtue of its excellent wettability, it is less susceptible to staining with lipid or fogging of the lens during its use.

According to the method of the present invention, even when the desired ocular lens such as a soft contact lens, is hardly mechanically processable due to its softness, it is possible to preliminarily suitably adjust the types or amounts of the polymerizable components to form a hydroxyl group-containing polymer having hardness suitable for mechanical processing and to shape such a hydroxyl group-containing polymer into a desired shape prior to reacting it with the silicon-containing compound, and to finally react the shaped polymer with the silicon-containing compound to make it soft. Thus, according to the method of the present invention, even when the finally obtainable ocular lens is essentially soft and hardly mechanically processable, if the hydroxyl group-containing polymer prior to the reaction with the silicon-containing compound is essentially hard so that it can be mechanically processable, it is possible to readily produce an ocular lens having a desired shape such as contact lens or an intraocular lens, by preliminarily subjecting such a polymer to mechanical processing.

What is claimed is:

1. An ocular lens obtained by reacting a hydroxyl group-containing polymer shaped to have an ocular lens shape, with a silicon-containing compound of the formula (I):

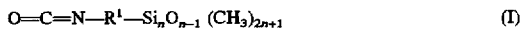

$$O=C=N-R^1-Si_nO_{n-1}(CH_3)_{2n+1} \qquad (I)$$

wherein $R^1$ is a $C_{1-6}$ linear or branched alkylene group, and n is an integer of from 1 to 15.

2. The ocular lens according to claim 1, wherein the hydroxyl group-containing polymer is a polymer obtained by polymerizing polymerizable components containing a hydroxyl group-containing monomer.

3. The ocular lens according to claim 2, wherein the hydroxyl group-containing monomer is a hydroxyl group-containing styrene monomer, a hydroxyl group-containing (meth)acrylate, or a monomer having a sugar residue and a copolymerizable unsaturated double bond.

4. The ocular lens according to claim 2, wherein the amount of the hydroxyl group-containing monomer is from 5 to 100 wt % of the total amount of the polymerizable components.

5. The ocular lens according to claim 2, wherein the polymerizable components contain the hydroxyl group-containing monomer and a monomer having a copolymerizable unsaturated double bond.

6. A method for producing an ocular lens, which comprises reacting a hydroxyl group-containing polymer shaped to have an ocular lens shape, with a silicon-containing compound of the formula (I):

$$O=C=N-R^1-Si_nO_{n-1}(CH_3)_{2n+1} \qquad (I)$$

wherein $R^1$ is a $C_{1-6}$ linear or branched alkylene group, and n is an integer of from 1 to 15.

7. The method for producing an ocular lens according to claim 6, wherein the hydroxyl group-containing polymer has a crosslinked structure.

8. The method for producing an ocular lens according to claim 7, wherein the hydroxyl group-containing polymer is preliminarily swelled by a solvent and then reacted with the silicon-containing compound.

* * * * *

UNITED STATES PATENT AND TRADEMARK OFFICE
CERTIFICATE OF CORRRECTION

PATENT NO. : 5,777,032
DATED : July 7, 1998
INVENTOR(S) : Yasuhiro Yokoyama, et al.

It is certified that error appears in the above-identified patent and that said Letters Patent is hereby corrected as shown below:

On the title page item [56], insert --

FOREIGN PATENT OR PUBLISHED FOREIGN PATENT APPLICATION

| | | DOCUMENT NUMBER | | | | | PUBLICATION DATE | COUNTRY OR PATENT OFFICE | CLASS | SUBCLASS | TRANSLATION YES | NO |
|---|---|---|---|---|---|---|---|---|---|---|---|---|
| | WO | 89 | 0 | 9 | 7 | 9 | 5 | 10/19/89 | WIPO | | | | |
| | EP | 0 | 5 | 30 | 1 | 4 | 0 | 08/13/92 | EUROPE | | | | |
| | EP | 0 | 10 | 6 | 0 | 0 | 4 | 10/14/82 | EUROPE | | | | |
| | EP | 0 | 73 | 9 | 9 | 1 | 9 | 04/24/96 | EUROPE | | | | |
| | EP | 0 | 18 | 2 | 9 | 2 | 4 | 11/22/84 | EUROPE | | | | |
| | | | | | | | | | | | | | |

--.

Signed and Sealed this

Second Day of March, 1999

Attest:

Attesting Officer

Q. TODD DICKINSON

Acting Commissioner of Patents and Trademarks